No. 865,634. PATENTED SEPT. 10, 1907.
L. E. DORON.
DRAFT EQUALIZER.
APPLICATION FILED NOV. 10, 1906.
2 SHEETS—SHEET 1.
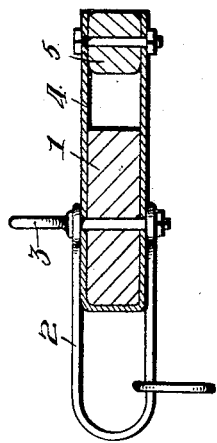
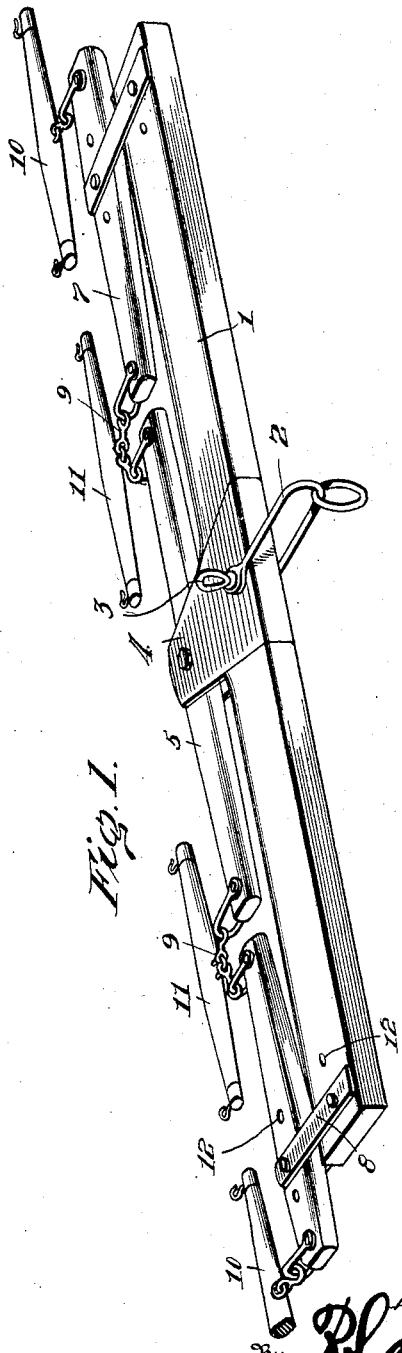
Witnesses
Inventor
Louis E. Doron,
By
Attorneys No. 865,634. PATENTED SEPT. 10, 1907.
L. E. DORON.
DRAFT EQUALIZER.
APPLICATION FILED NOV. 10, 1906.
2 SHEETS—SHEET 2.
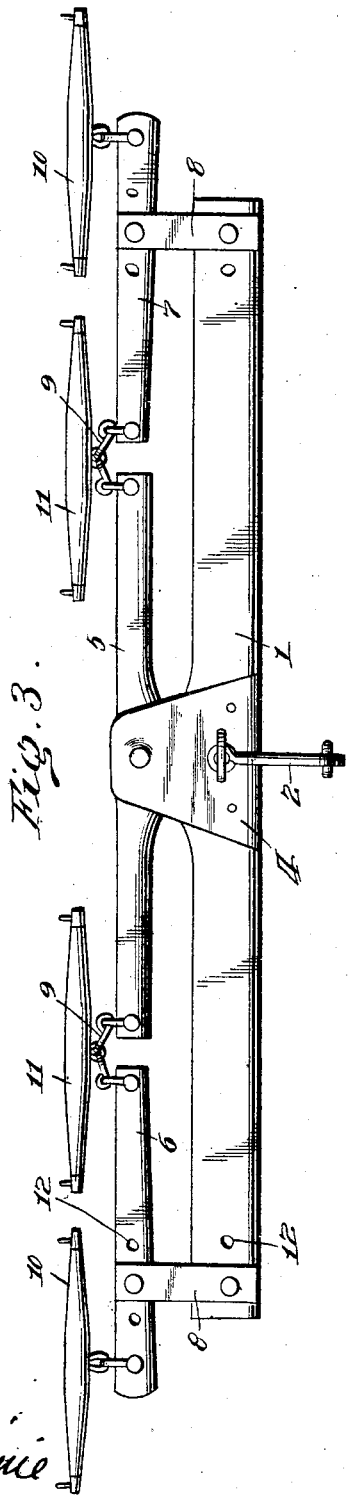
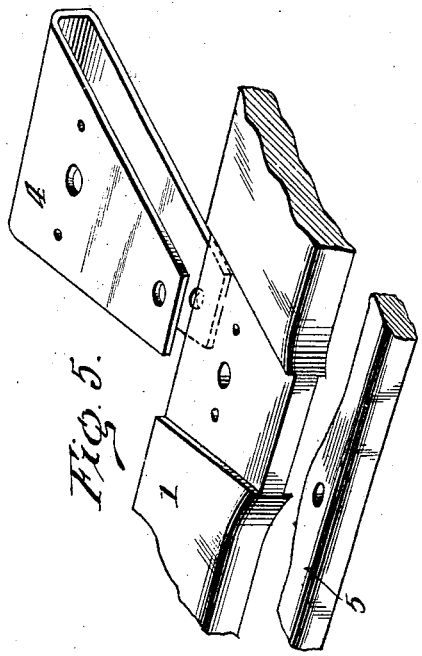
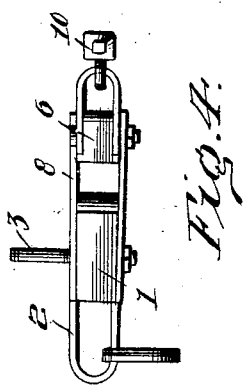
Witnesses
Inventor
Louis E. Doron
By
Attorneys

UNITED STATES PATENT OFFICE.

LOUIS E. DORON, OF THAYER, KANSAS.

DRAFT-EQUALIZER.

No. 865,634.  Specification of Letters Patent.  Patented Sept. 10, 1907.

Application filed November 10, 1906. Serial No. 342,876.

*To all whom it may concern:*

Be it known that I, LOUIS E. DORON, a citizen of the United States, residing at Thayer, in the county of Neosho and State of Kansas, have invented certain new and useful Improvements in Draft-Equalizers, of which the following is a specification.

This invention relates to that type of devices designed for use in connection with vehicles and commonly called draft equalizers.

The invention contemplates the provision of a peculiar construction of equalizers admitting of a varied adjustment of the parts thereof to permit of hitching draft animals in various numbers to the vehicle to which the equalizer may be connected.

In the special construction of the invention an equalizer comprising the same is adapted to be so adjusted as to permit of hitching anywhere from four to twelve, or more draft animals to the load, and the special form and arrangement of the parts is particularly advantageous under actual conditions of service.

For a full understanding of the invention and the merits thereof and also to acquire a knowledge of the details of construction and the means for effecting the result, reference is to be had to the following description and accompanying drawings, in which:

Figure 1 is a perspective view of a draft equalizer embodying the invention; Fig. 2 is a transverse vertical sectional view; Fig. 3 is a top plan view; and Fig. 4 is an end elevation. Fig. 5 is a fragmentary view more clearly showing the form of certain parts of the invention.

Corresponding and like parts are referred to in the following description and indicated in all the views of the drawings by the same reference characters.

The construction of the equalizer as illustrated is especially adapted for the use of four draft animals, though it will be readily understood without further remark that by the substitution of double trees for the swingle trees, or by variation in the adjustment of the equalizing levers, the device may be used in connection with any suitable number of draft animals such as it might be desirable to employ for loads of greater or less bulk.

The invention consists essentially of a main draft beam 1, the center portion of which is adapted to be connected by a draft link 2 with the load which is to be drawn by means of the device. The draft link 2 is attached peculiarly to the draft beam 1, a pin or pivot 3 being employed for the purpose and passing vertically through the beam 1 and through the ends of the link 2. Not only does the pin or pivot 3 secure the link 2 to the beam 1, but said pivot may readily constitute the single and only means, if desired, for attaching a central draft yoke 4 to the intermediate portion of the beam 1. The beam 1 is received between the upper and lower sides of the yoke 4, and the pin 3 passes through the parts in the manner shown to secure the link and yoke to the beam 1. The front end portion of the yoke 4 extends forwardly from the beam 1 and between the upper and lower sides of said yoke, at this portion is pivotally mounted an equalizing lever 5. Equalizing levers 6 and 7 are attached to the ends of the beam 1 by means of link plates 8, and furthermore the adjacent end portions of the levers 5, 6 and 7 are attached together by means of flexible connections 9 preferably in the form of chains. Whiffle trees 10 are attached to the outer ends of the levers 6 and 7 and similar whiffle trees 11 are secured to the flexible connections 9 before mentioned as shown. The whiffle trees 10 and 11 are swingle trees and permit of hitching four draft animals to the equalizer when in actual use. The number of draft animals adapted to be hitched to the device may be varied however, by reason of the fact that the levers 6 and 7, as well as the ends of the draft beam 1 are provided with a plurality of openings 12, whereby to admit of adjustment of the pivotal fastenings by which the link plates 8 connect the levers 6 and 7 with the beam 1. It will be obvious by varying the points of pivotal connections of these parts that the leverage thereof may be changed to admit of variation in the number of draft animals in a manner very apparent.

The construction of the invention is very simple and is easily adjusted as is necessary in devices of this class and possesses other advantages which will be readily appreciated by reference to this description.

Having thus described the invention, what is claimed as new is:

1. A draft equalizer comprising a main draft beam, the equalizing levers 5, 6 and 7 pivotally connected with the intermediate and end portions of the draft beam, the flexible connections between adjacent ends of the levers 5, 6 and 7, the pivotal connections between the beam and the levers 6 and 7 being adjustable, whiffle trees secured to the outer ends of the levers 6 and 7, and other whiffle trees connected with the flexible connections between the levers 5, 6 and 7, as specified.

2. A draft equalizer substantially as set forth, comprising a main draft beam, a yoke projecting outwardly from said beam and receiving the body thereof between its sides and located at a central point on the length of the beam, a draft link connected with the beam, a pivotal fastening connecting the draft link to the beam and passing through the beam and the sides of the yoke aforesaid securing said parts together, the equalizing lever 5 pivoted centrally thereof to the yoke aforesaid, the end equalizing levers 6 and 7, draft links adjustably connected with the ends of the beam and with the intermediate portions of the equalizing levers 6 and 7, whiffle trees connected with the outer ends of the equalizing levers 6 and 7, flexible connections between the adjacent ends of the levers 5, 6 and 7, and whiffle trees connected with said flexible connections for the purpose specified.

In testimony whereof I affix my signature in presence of two witnesses.

LOUIS E. DORON. [L. S.]

Witnesses:
V. H. COWDEN,
W. A. WALTHALL.